June 14, 1938.  R. W. JOHNSON  2,120,364
DEVICE FOR CONTROLLING THE SUPPLY OF FUEL TO OIL BURNERS AND THE LIKE
Filed March 3, 1933  4 Sheets-Sheet 2
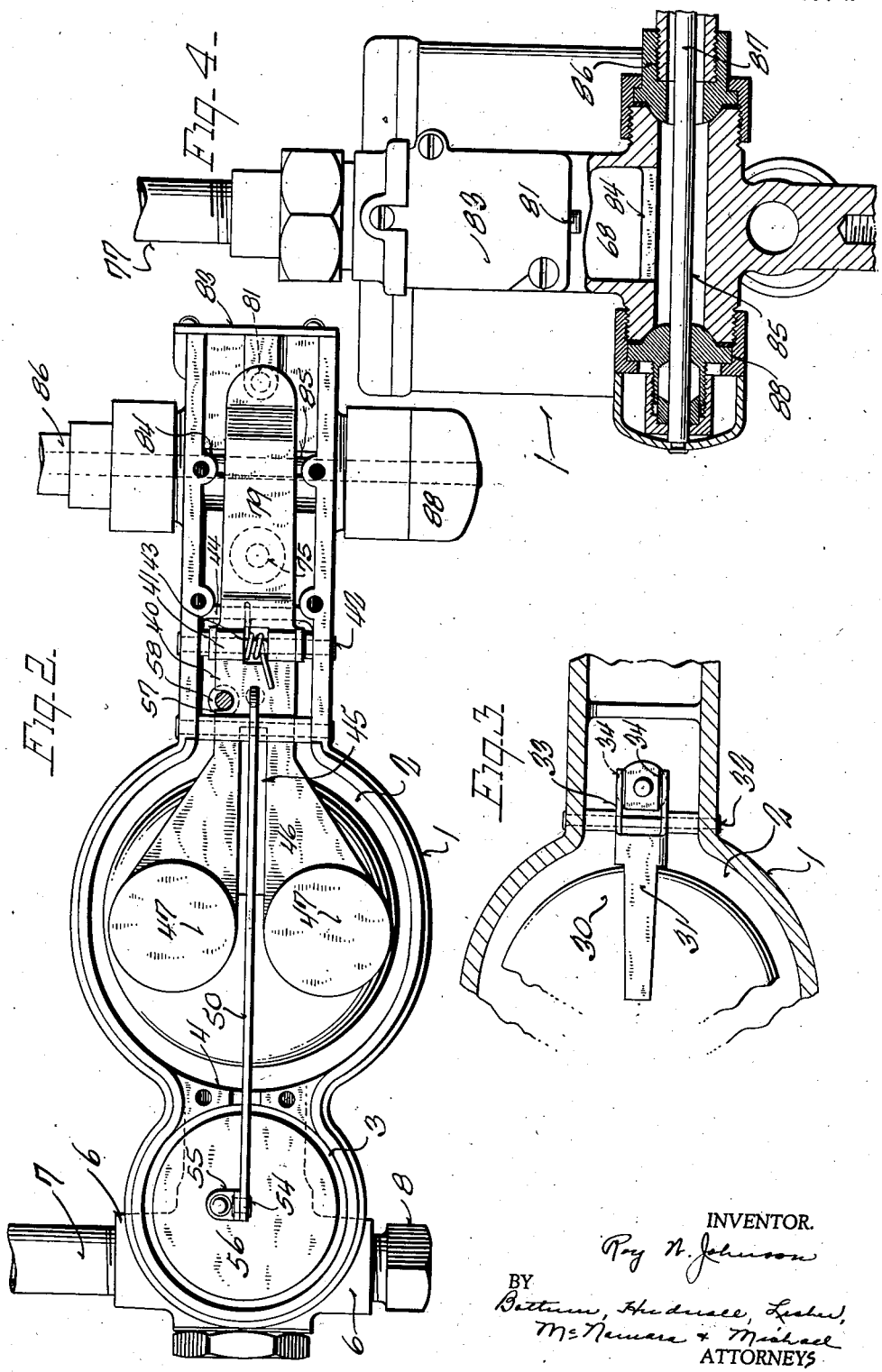
INVENTOR.
Roy N. Johnson
BY
ATTORNEYS June 14, 1938.  R. W. JOHNSON  2,120,364
DEVICE FOR CONTROLLING THE SUPPLY OF FUEL TO OIL BURNERS AND THE LIKE
Filed March 3, 1933  4 Sheets-Sheet 3
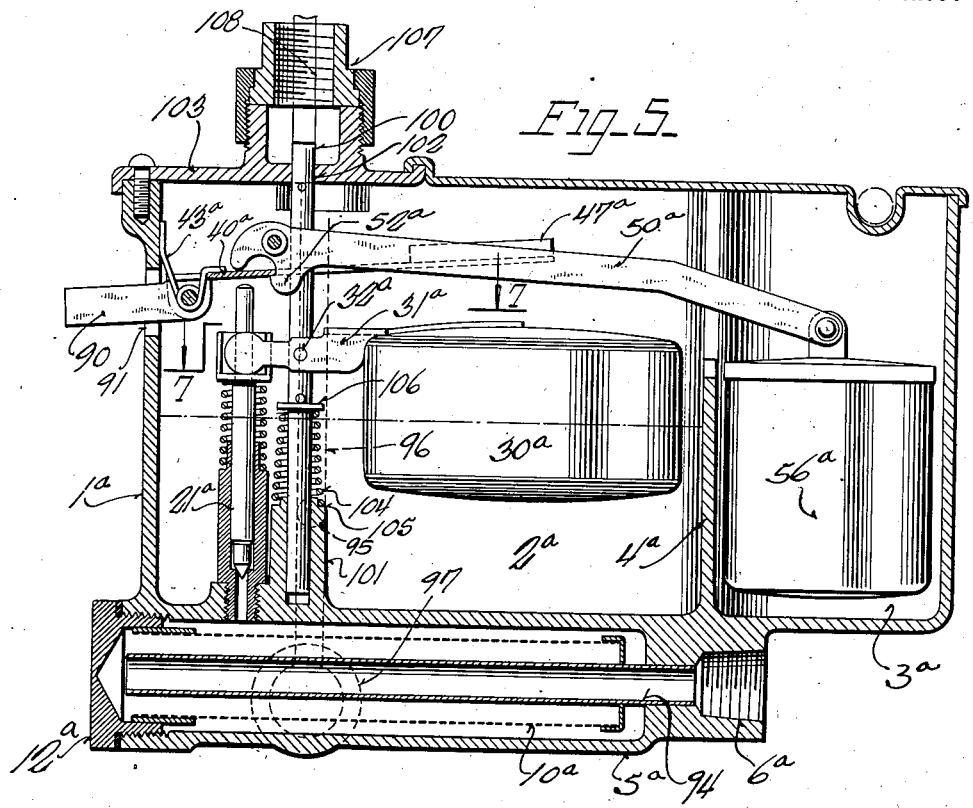
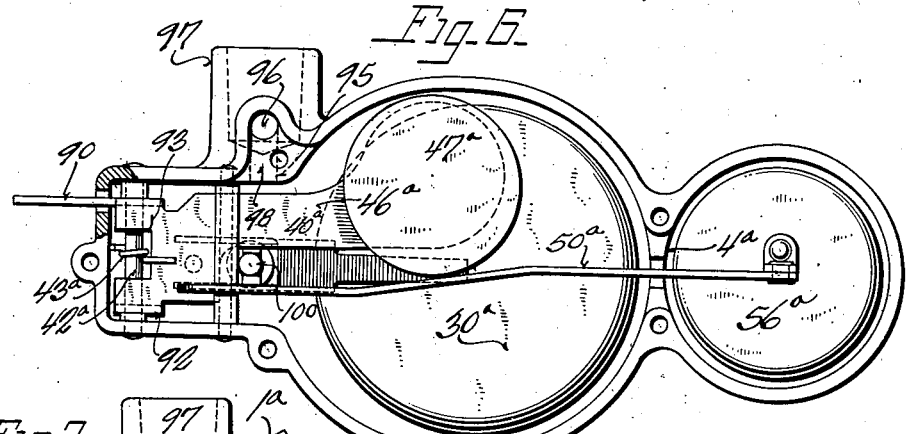
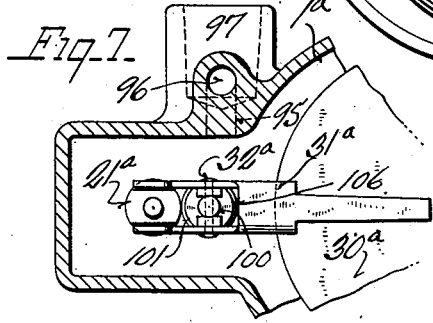
INVENTOR.
Roy N. Johnson
BY
ATTORNEYS

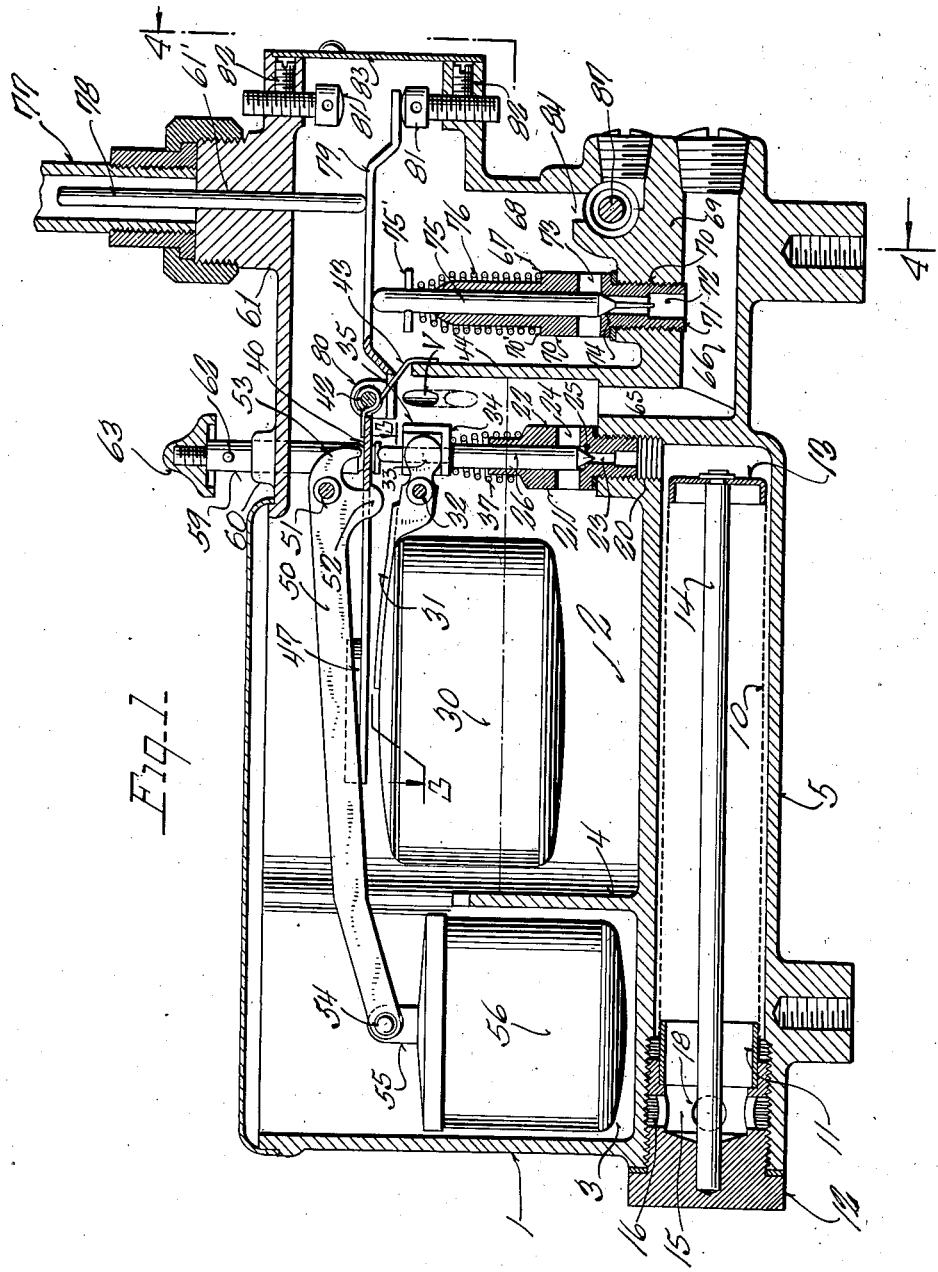

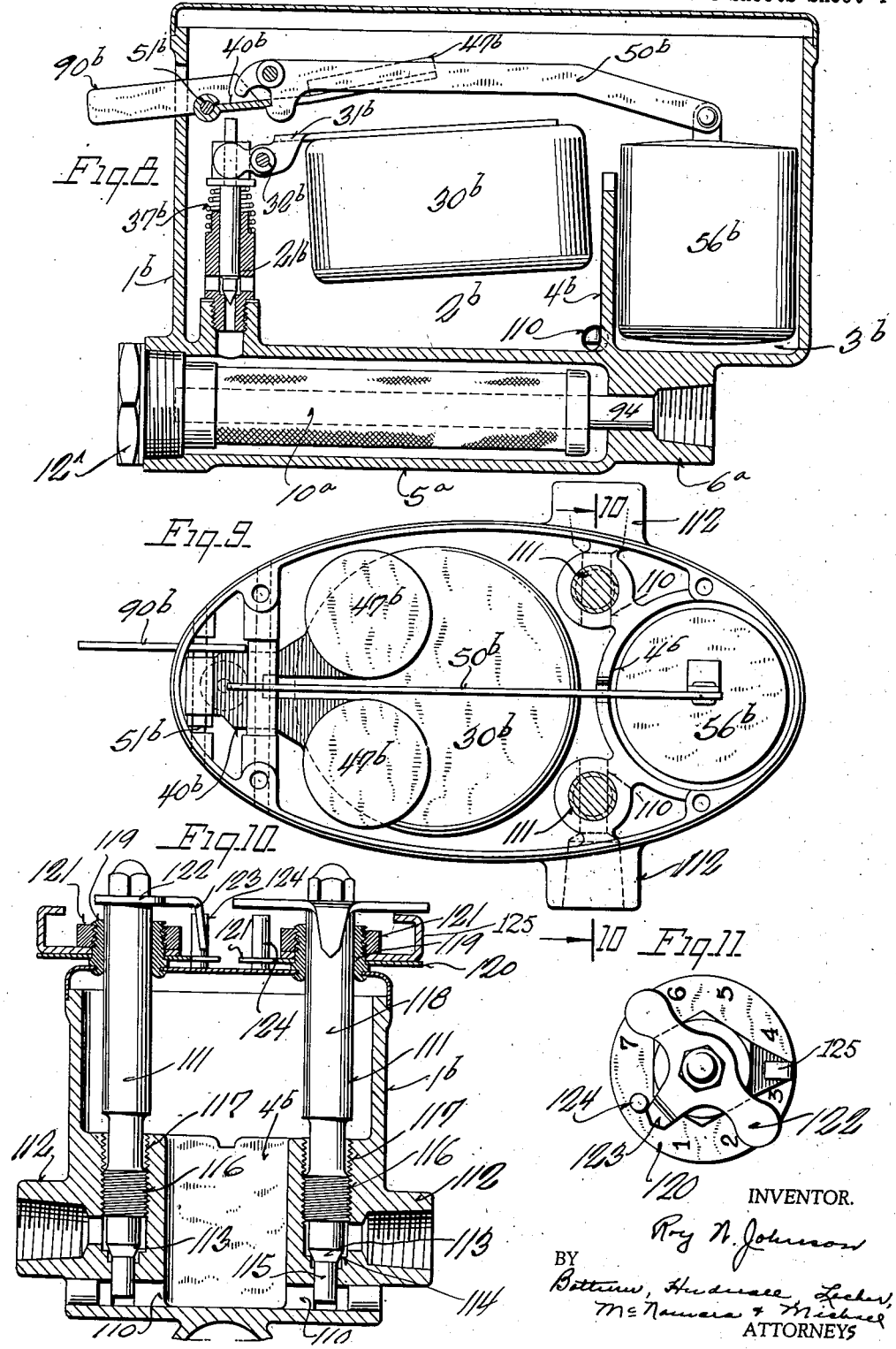

Patented June 14, 1938

2,120,364

UNITED STATES PATENT OFFICE 2,120,364

DEVICE FOR CONTROLLING THE SUPPLY OF FUEL TO OIL BURNERS AND THE LIKE

Roy W. Johnson, Milwaukee, Wis., assignor to Automatic Products Company, Milwaukee, Wis., a corporation of Wisconsin Application March 3, 1933, Serial No. 659,448

6 Claims. (Cl. 137—68)

This invention relates to liquid level control devices especially designed and adapted for use in connection with oil burners.

With oil burners of the type employing a gravity feed of the liquid fuel it is usual to employ a float controlled inlet valve to maintain a certain level of the oil in the fuel supply chamber associated with the oil burner. With devices of this sort it is important to insure the closing of the inlet valve when the oil reaches the predetermined level in order to prevent flooding of the burner and to avoid the hazard and waste due to escape of the oil.

The present invention has for one of its objects the provision of a simple, compact and closely organized structure for insuring the closure of the inlet valve to the fuel supply chamber in the event the main float controlling such valve is unable or fails to effect closure thereof upon rise of the fuel to above the selected or predetermined level.

Another object of the invention is to provide a liquid level control device of this character which avoids the necessity of handling the excess fuel supplied to the fuel supply chamber and which returns this fuel to the system automatically upon resetting of the liquid level control device.

A further object of the invention is to provide a liquid level control device of this character which is susceptible of embodiment in various types of fuel supply systems, being capable of use in a closely organized structure employing a thermostatically controlled or a manually controlled outlet valve between the fuel supply chamber and the burner and being also capable of embodiment in a similarly advantageous structure wherein the regulation of the feed of the fuel to the burner is had by changing the level of the liquid in the fuel supply chamber to thereby effect the supply of fuel to the main or pilot wick of the oil burner.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view partly in central vertical longitudinal section and partly in side elevation showing the invention embodied in that type of structure which employs a thermostatically controlled outlet valve between the fuel supply chamber and the burner;

Figure 2 is a top plan view of the device shown in Figure 1 with the cover plate and thermostat removed;

Figure 3 is a fragmentary view in horizontal section taken on line 3—3 of Figure 1 and looking in the direction of the arrows;

Figure 4 is a view partly in end elevation and partly in vertical section, the view being taken on line 4—4 of Figure 1;

Figure 5 is a view in central vertical longitudinal section with parts shown in elevation and illustrating the invention embodied in a structure wherein the feed of the fuel is regulated by varying the level maintained in the fuel supply chamber;

Figure 6 is a plan view of the structure shown in Figure 5 with the cover plate and parts carried thereby removed and with parts shown in section for the sake of illustration;

Figure 7 is a fragmentary view in horizontal section taken on line 7—7 of Figure 5 and looking in the direction of the arrows;

Figure 8 is a view in central vertical longitudinal section with parts shown in elevation and illustrating the invention embodied in that type of system employing manually adjustable outlet valves regulating the feed of liquid fuel from the fuel supply chamber to the burner;

Figure 9 is a plan view of the structure shown in Figure 8, the cover plate being removed and parts being shown in section for the sake of simplicity in illustration;

Figure 10 is a view in transverse vertical section taken on line 10—10 of Figure 9 with parts shown in elevation for the sake of illustration; and Figure 11 is a detail view in plan showing the dial plate, pointer and stop provided for each of the manually adjustable outlet valves shown in Figure 10.

In the embodiment of the invention illustrated in Figures 1 to 4, inclusive, a casing designated generally at 1 is provided and has a fuel supply or main float chamber 2 and an auxiliary float chamber 3 therein, these chambers being separated by a dam or partition 4, the upper edge of which is located a short distance above the normal level maintained in the fuel supply chamber 2. A fuel supply conduit 5 is provided and may be cast integral with the casing 1. At one end this conduit 5 has fuel supply nipples or connections 6 formed integral therewith. Thus nipples 6 are provided at each side of the casing to make it convenient to install the devices under the varying conditions met with in practice but ordinarily only one is connected up to a fuel supply pipe 7, the other being plugged as at 8. In the conduit 5 a strainer 10 is provided, the strainer being in the form of a reticulated or screen tubing having one end suitably attached to a short sleeve 11 carried by a plug 12 and having its other end suitably attached to an imperforate metal cup 13 supported at one end of a rod 14, the other end of the rod being fitted in an opening provided in the plug 12 and being suitably attached thereto. The plug 12 is threaded into an opening provided at one end of the conduit 5 and its inner end is hollowed out as at 15 to freely communicate with the short sleeve 11. The hollowed out portion is provided with an external annular groove 16 in open communication with the nipples 6 and this groove 16 communicates through openings 18 with the interior of the hollowed out portion and consequently with the interior of the strainer 10.

At the end of the conduit 5 opposite the plug 12 an internally threaded opening 20 is provided in the wall of the casing between the supply chamber 2 and the conduit 5. The communication which this opening may afford between the conduit 5 and the chamber 2 is regulated by an inlet valve designated generally at 21. The inlet valve 21 comprises a casing 22 having its lower end threaded into the opening 20 and provided with an axial opening 23 and transverse openings 24 which communicate with the chamber 2. At the intersection of the openings 23 and 24 a valve seat 25 is provided. The beveled lower end of a needle valve 26 coacts with this valve seat 25 to regulate the flow of the liquid fuel from the conduit 5 through the lower portion of the axial opening 23 and through the transverse openings 24 into the chamber 2. As shown, the needle valve 26 is slidably interfitted in the upper portion of the axial opening 23 which is adapted to receive the same. The operation of the needle valve 26 is controlled by a main float 30 fastened to one end of a lever 31 fulcrumed on a pin 32 carried by the casing 1 and having a bifurcated end 33 interconnected with the needle valve 26. The arms of the bifurcated end are rounded as shown in Figure 1 and bear against shoulders 34 formed on an abutment collar 35 fitted on and suitably fixed to the upper end of the needle valve 26. A coil spring 37 encircles the upper portion of the needle valve 26 and has one end abutting the casing 22 and its other end abutting the collar 35. The spring 37 is under such compression as to be operative to move the needle valve 26 upwardly to open position upon fall of the level of the liquid below the selected or predetermined level.

In the normal operation of the device the needle valve 26 is opened and closed upon change of level in the chamber 2 under the action of the float 30. At times, due to the presence of grit on the valve seat 25 or for other reasons, the float 30 is ineffective to close the valve 26 even though the liquid level in the chamber 2 rises above the selected or predetermined level.

The present invention proposes the provision of auxiliary means of novel character for insuring the closure of the needle valve when such conditions obtain. Broadly, this auxiliary means consists of a valve closing member biased to a position wherein it is effective to close the needle valve 26 but which is normally latched in inoperative position, the latch, however, being automatically released to permit the valve operator to act to close the valve when the level of liquid in the fuel supply chamber rises above that which the main float tends to maintain.

As illustrated in the drawings, the valve operator consists of a plate-like member 40 having at one end thereof short bearing sleeves 41 transversely alined and, if desired, integral with the member 40. A pivot pin 42 carried by the side walls of the casing 1 extends through these sleeves 41 and provides a pivotal support for the member 40. The member 40 is biased to swing downwardly so that its imperforate body portion will strike and punch the valve 26 to closed position. This biasing action may be had by means of weights or a spring or both. In the present instance a coil spring 43 is wound about the pivot pin 42 between the bearing sleeves 41 and has one end abutting against an internal wall or partition 44 of the casing and has its other end bearing down on the body portion of the plate 40. As will be understood from Figure 2, the plate 40 is formed with a lengthwise slot 45 extending partway therealong and out through the free end thereof. The wing formations 46 of the member 40 occurring on each side of the slot 45 may be weighted as at 47 to aid in the biasing action referred to.

For the purpose of normally maintaining the member 40 in elevated inoperative position, a latching lever 50 is provided and is fulcrumed as at 51 on a pin mounted on the side walls of the casing 1. The lever 50 overlies the member 40 and to some extent is accommodated in its slot 45. Adjacent its fulcrum this lever 50 is provided with an integral latching hook 52 engageable with the underside of the body portion of the member 40 at the inner end of the slot 45 when functioning to latch the member 40 in its elevated or inoperative position. A camming projection 53 is also formed integral with a portion of the lever 50 adjacent its fulcrum and is engageable with the body portion of the member 40 when the device is being reset, as will hereinafter more fully appear. The end of the lever 50 remote from its fulcrum 51 is pivotally connected as at 54 with a projection 55 secured to and extending upwardly from an auxiliary float 56.

One side edge of the body portion of the member 40 is notched as at 57. The marginal edges of this notch 57 engage in an annular groove 58 adjacent the lower end of a resetting stem 59 which is slidable in a bearing or opening 60 provided therefor in the section 61 of the top of the casing. A stop pin 62 limits the downward movement of this stem. At its upper end the stem 59 may be provided with a knob 63 to facilitate gripping and actuation thereof.

Under normal operating conditions with the structure as thus far described, the parts are positioned as shown in Figure 1, with the main float 30 acting upon a fall of the level below the selected or predetermined level indicated by the dot and dash line to permit the spring 37 to open the valve 26 and allow liquid fuel to flow into the chamber 2 until the predetermined level is restored, whereupon the rise of the main float 30 acts through the lever 31 to close the valve 26 against the action of its spring 37. Under such conditions there is no liquid in the auxiliary float chamber 3 and the weight of the float and the natural bias of the lever 50 retains the latching hook 52 of the lever 50 engaged with the body portion of the valve operator 40 to hold this valve operator in its elevated inoperative position notwithstanding its bias. Now then, should the main float 30, due to the presence of grit on the valve seat 25 or for other reasons, be ineffective to close the valve 26 after the level of the fuel in the chamber 2 has risen above the selected level then liquid fuel will continue to run into the chamber 2 past the open valve 26 and the level will continue to rise until the liquid fuel flows over the dam or partition 4 and into the auxiliary float chamber 3. The flow of liquid into the chamber 3 will cause the auxiliary float 56 to rise thereby swinging the lever 50 in a clockwise direction as viewed in Figure 1 and disengaging the latching hook 52 from the member 40. This frees the member 40 and allows it to swing quickly downwardly under the influence of its spring 43 and its weights 47. Such downward swinging of the valve operator 40 causes its body portion to strike the upper end of the needle valve 26 with a hammer-like blow thereby punching or forcibly thrusting the needle valve 26 to closed position. Upon such occurrence flow of any more liquid fuel into the supply chamber 2 is prevented and when the liquid fuel in this chamber has been exhausted the burner will be extinguished. The device may be reset by pulling upwardly on the knob 63 which causes the stem 59 to move upwardly and the stem in turn swings the member 40 up away from the needle valve 26 thereby restoring the needle valve to the control of the main float 30. This upward movement of the member 40 causes its body portion to engage the camming projection 53 of the lever 50 and as a result the lever 50 is swung in a counter-clockwise direction as viewed in Figure 1. Such swinging of the lever 50 brings the latching hook 52 into engagement with the body portion of the member 40 to releasably secure this member 40 in elevated inoperative position and since such movement of the lever is accompanied by a downward movement of the auxiliary float 56 the liquid which had flowed into the auxiliary float chamber 3 will be displaced back into the main fuel supply chamber 2.

The mechanism described will be adequate to take care of all of the conditions, usual or unusual, which occur from time to time in the operation of a device of this sort, but, if desired, flooding of the burner due to failure of both the main float and auxiliary safety mechanism to close the valve 26 may be avoided by providing a vent opening V in one of the walls of the casing, the vent opening communicating at its inner upper end with the interior of the fuel supply chamber 2 at a point somewhat above the top edge of the dam or partition 4 and communicating at its outer lower end with the exterior. Of course, such an expedient results in spilling of the fuel in the region of the liquid level control device and would be unsatisfactory to take care of the usual conditions met. It may be, however, that such an expedient is to be preferred to a flooding of the burner under any circumstances.

The fuel supply chamber 2 communicates through passages 65 and 66 and through an outlet valve designated generally at 67 with an outlet chamber 68. The chamber 68 is defined by portions of the side walls and one end wall of the casing, by the vertical transverse partition 44 and by a horizontal partition 69 which forms the bottom of the outlet chamber and extends over the passage 66. In this horizontal partition 69 an internally threaded opening 70 is provided and receives the externally threaded lower end 71 of the valve casing 70. This valve casing 70 is formed with an axial passage 72 communicating with transverse passages 73. The passage 72 opens to the passage 66 while the passages 73 open into the outlet chamber. At the juncture of the passages 72 and 73 a valve seat 74 is provided and coacts with the beveled portion of a needle valve 75. The needle valve 75 is slidably fitted in the upper portion of the axial opening 72 of the valve casing. A coil spring 76 encircles the upper portion of the valve casing and the portion of the valve 75 which projects above the same, the lower end of the spring 76 abutting a shoulder 70' provided therefor on the valve casing and the upper end engaging and pressing upwardly on a cross pin 75' secured to the valve 75. Thus, the spring 76 tends to open the outlet valve 75. In the present structure it is proposed to control the opening and closing of the valve 76 from a thermostat of conventional construction, a portion of which thermostat is designated at 77. A thermostat is carried by the section 61 of the casing top and is subjected to the temperature which is to affect the operation of the burner. The rod 78 extends down through an opening 61' provided in the section 61 and bears at its lower end against the intermediate portion of a lever 79. The lever 79 is provided at one end with integral apertured ears 80 through which the pivot pin 42 extends whereby to provide a fulcrum for this lever. The free end of the lever operates between adjustable stop screws 81 threadedly engaged with the casing and held in adjusted position by lock screws 82. A removable cover plate 83 provides for access to the screws 81 and 82.

With this construction, when the thermostat calls for heat the lower end of the rod 78 moves upwardly whereupon the valve 75 opens since the spring 76 presses upwardly on the valve stem and since the valve stem at this time may displace the lever 79 upwardly inasmuch as this lever 79 is free to follow the upwardly moving lower end of the rod 78. Should the heat generated by the burner exceed that required for the purposes for which the burner is employed and the thermostat become heated to such an extent that the expansion will move the rod 78 downwardly then the lower end of this rod presses downwardly on the lever 79 and the lever 79 in turn presses downwardly on the valve 75, to move the valve to closed position against the action of its spring 76.

The fuel which passes into the outlet chamber 68 flows freely to the burner through an opening 84, a passage 85 and a fuel supply line 86. In the fuel supply line 86 a conventional clean-out rod 87 may be provided and may be mounted on the casing 1 as indicated at 88. Since this clean-out rod and its mounting form no part of the present invention they will not be described in detail.

In the embodiment of the invention shown in Figures 5 to 7, inclusive, substantially the same means is employed for normally regulating the opening and closing of the inlet valve and for insuring closure thereof in the event of failure of the main float. In fact, this second embodiment differs from that just described only in the provision of a different means for regulating the flow of liquid from the main fuel supply chamber to the burner; in the provision of a slightly different resetting member, and in the design of the casing and of the fluid supply structure that leads to the inlet valve. Referring to Figures 5 to 7, it will be seen that there is provided as before a casing designated at 1a and having therein a main fuel supply chamber 2a, and an auxiliary float chamber 3a with a dam or partition 4a separating these two chambers. An inlet valve designated at 21a corresponds with the inlet valve 21 and is opened and closed normally under the control of a main float 30a acting through a lever 31ª. Should the main float 30ª for any reason be ineffective to close the inlet valve 21ª the fuel will rise to such level in the chamber 2ª as to flow over into the chamber 3ª thereby elevating the float 56ª which acts through a lever 50ª to disengage the latching hook 52ª from the body portion of the biased valve operator 40ª and permit this operator to swing forcibly downward, under the influence of its weight 47ª and spring 43ª, and hence to punch or thrust the valve 21ª to closed position. The resetting means for the auxiliary valve operator is slightly different in that the stem 59 is omitted and a resetting arm designated at 90 is formed integral with the valve operator 40ª, this arm extending through a slot 91 in the casing 1ª and projecting beyond the same so that it may be conveniently operated from the exterior. The valve operator 40ª is of slightly different design in that it has only one wing designated at 46ª and in that its pivotal mounting is provided by a pivot pin 42ª mounted on the casing 1ª and extending through openings provided in a downturned ear 92 integral with one edge of the valve operator 40ª and in the arm 90. The spring 43ª is coiled about this pin 42ª and has one end bearing against the adjacent wall of the casing 1ª and its other end bearing down on the valve operator 40ª the coiled portion of the spring being accommodated in a cut-out portion or recess 93 provided therefor in the valve operator 40ª.

Fuel is supplied from any suitable source to an internally threaded nipple 6ª integral with one end of the supply conduit 5ª. This conduit 5ª contains a strainer 10ª similar to the strainer 10 and supported at one end on a removable plug 12ª and at its other end on an inlet tube 94, one end of which communicates with the nipple 6ª and the other end of which communicates with the interior of the strainer.

The liquid fuel flows by gravity from the chamber 2ª to the burner (not shown) and in so doing passes through a lateral passage 95 provided in one wall of the casing and down through a vertical passage 96 to an outlet fitting or nipple 97 which connects with a fuel supply line leading to the burner. The passage 96 communicates at its lower end with the nipple 97 and at its upper end opens through a shelf 98 provided in the casing below its top whereby to afford the desired venting action.

When a liquid level control device of this character is used with a burner of the type having a main wick and a pilot wick the level of the fuel normally maintained in the supply chamber 2ª by the main float 30ª may be changed, that is, raised or lowered, in order to supply sufficient fuel to charge the main wick or to supply only a reduced amount and thus charge or feed only the pilot wick. In the present instance, this is accomplished by raising and lowering the fulcrum 32ª of the float lever 31ª. The fulcrum 32ª is in the form of a pin which passes through a vertical rod 100 and through the arms of the bifurcated portion of the lever 31ª. The lower end of the rod is slidably fitted in a socket-like bearing 101 while the upper end thereof is slidably interfitted with a bearing 102 provided therefor in the top 103 of the casing. A spring 104 encircles a portion of the rod 100, and has its lower end abutting a shoulder 105 formed at the upper end of the bearing 101 and has its upper end engaging an abutment 106 secured on the rod 100 and which may be in the form of a washer and cross pin. The spring 104 is designed to maintained the rod elevated as shown in Figure 5, thereby disposing the fulcrum in its high or uppermost position. In the elevated position of the fulcrum the main float 30ª will so operate the valve 21ª as to maintain a relatively high level in the fuel supply chamber 2ª. At such high level there is sufficient head to cause the fuel to be delivered to the burner in an amount sufficient to supply both the main wick and the pilot wick. When the rod 100 is depressed the fulcrum 32ª is lowered and the main float 30ª will then so operate the valve 21ª that a lower level fuel will be maintained in the chamber 2ª with the consequence that only sufficient fuel will be fed to the burner as is required to supply the pilot wick.

The position of the rod 100 may be controlled in various ways. The present invention proposed to control it thermostatically, the thermostat being subjected to the heat of the burner or to the heat of the environment which is selected as the regulating influence. For this purpose, a thermostat shown diagrammatically at 107 and shown at the casing top 103 is provided and has its rod 108 designed to engage and push down on the upper end of the rod 100 thereby lowering the fuel supply level upon the occurrence of excessive heat. When the thermostat calls for heat, that is, when it is cooled off, the rod 108 is elevated and allows the spring 104 to move the rod 100 upwardly thereby restoring the fulcrum 32ª to its elevated position and increasing the head of the fuel to the extent necessary to supply both the main wick and the pilot wick.

The embodiment of the invention shown in Figures 8 to 11, inclusive, is similar to the embodiments previously described and especially to that embodiment shown in Figures 5 to 7, although differing therefrom especially in that the fulcrum for the main float is fixed and in that one or more manually adjustable valves are provided for regulating the flow of fuel from the main fuel supply chamber to the burner. As shown in Figures 8 to 11, this embodiment comprises a casing 1ᵇ having a fuel supply chamber 2ᵇ and auxiliary float chamber 3ᵇ separated by a partition or dam 4ᵇ. Fuel is supplied to the chamber 2ᵇ through a float controlled needle valve 21ᵇ, the fuel being supplied from any suitable source to fluid inlet connections and strainer identical with that shown in Figure 5 and hereinbefore described. The valve 21ᵇ is controlled by a main float 30ᵇ which has its lever 31ᵇ fulcrumed on a pin 32ᵇ and interconnected with the needle valve. The float 30ᵇ is normally effective to close the needle valve but when the level lowers below the selected or predetermined level the spring 37ᵇ associated with the valve 21ᵇ functions to open the valve. In the event the float 30ᵇ upon rise of the liquid above the predetermined level should be ineffective to close the valve 21ᵇ there will be an overflow of liquid into the auxiliary float chamber 3ᵇ and the auxiliary float 56ᵇ will be elevated and will act through the lever 50ᵇ to release the auxiliary valve operator 40ᵇ which will swing down under the influence of its biasing means such as its weights 47ᵇ to punch or thrust the inlet valve 21ᵇ to closed position. As shown, this valve operator 47ᵇ is fulcrumed as at 51ᵇ on the casing and has a resetting arm 90ᵇ projecting exteriorly of the casing.

The operation of this auxiliary valve operating mechanism will be obvious from the foregoing description and from an inspection of Figures 8 and 9.

The liquid fuel flows from the supply chamber 2ᵇ through openings 110 and past manually adjustable valves 111 to nipples or connections 112 which are adapted for connection with a fluid supply line leading to the burner or burners. Two valves 111 are shown but in many instances only one will be used and in fact in many cases the device will be equipped with only one of these valves. In such event one of the nipples 112 will be capped or plugged. Each valve 111 has a beveled portion 113 cooperable with a valve seat 114 provided around the port connecting each opening 110 with its nipples 112. Below the beveled portion 113 each valve is provided with a guide stem 115 of a diameter less than that of the port through which it extends. Above the beveled portion 113 each valve has an externally threaded portion 116 engaging a correspondingly threaded bearing 117 provided therefor in the casing 1ᵇ. The main stems of the valves are designated at 118 and project up through bushings 119 provided therefor in the top of the casing. An annular dial 120 is fitted over the bushing and is clamped in position by a nut 121. On each valve stem an operating handle 122 and a pointer or indicator 123 is fixed. A stop pin 124 coacts with each pointer to limit the movement of the valve in one direction. Adjustable stops 125 may be provided and are frictionally clamped between the nuts 121 and dials 120. The openings of the dials 120 and the portions of the bushings 119 which they engage may be of non-circular cross section to prevent rotary displacement of the dials. As shown in Figure 11, each dial is provided with numbers which indicate the different positions of the valve. It will be understood that by turning either knob 122 its valve stem 118 will be rotated and due to the action of the threaded portion 116 and its bearing 117 the beveled portion 113 will be moved toward or away from each seat 114 depending upon the direction in which the handle 122 is turned.

In all forms of the invention a simple, compact and closely organized device is had which maintains the proper or desired level of fuel in the fuel supply chamber and which is equipped with an auxiliary inlet valve closing arrangement operable automatically to close the inlet valve in the event the main float is unable to do so. This auxiliary valve closing mechanism is so constituted as to be contained within the same casing as the main float controlled mechanism and the parts are so organized that this auxiliary mechanism, upon being reset, will itself displace the fuel from the auxiliary float chamber back into the main float chamber.

The mechanism not only has these advantages but also lends itself for organization in a practical and simple way with manually or thermostatically controlled outlet valves employed between the main fluid supply chamber and the burner or with other means for varying or regulating the flow from the main fuel supply chamber to the burner.

While I have shown and described several embodiments of the invention, it is to be understood that the structures illustrated have been selected merely for the purpose of illustration and that various changes in the size, shape and arrangement of the parts may be made without departing from the spirit of the invention or the scope of the subjoined claims.

The invention claimed is:

1. A device of the character described, comprising a casing having a bottom wall and containing a reservoir provided with an outlet, said wall having an aperture, an inlet member secured in said aperture and extending upward into said reservoir, said member having an inlet passageway therethrough with an internal annular shoulder, a control member in said passageway and having means cooperable with said shoulder to control flow to said reservoir, said inlet member having guide means for said control member, said control member projecting from said inlet member and having a lateral flange, a pivotally supported lever arm in said casing and having one end portion cooperable with said flange to actuate said control member, a float in said reservoir and carried by the other end portion of said lever arm, an overflow chamber having communication with said reservoir, a float in said chamber operable upon overflow of liquid from said reservoir, a normally inactive lever in said casing and cooperable with said second-named float, said normally inactive lever being normally out of engagement with said control member and operable on said control member to close said inlet passageway upon overflow of liquid into said chamber, a stop member limiting movement of said normally inactive lever in one direction, and a spring holding said normally inactive lever in engagement with said stop member and operable to urge said control member toward closed position.

2. A device of the character described, comprising a casing containing a constant level chamber having an inlet and an outlet, means controlling said inlet, a lever fulcrumed in said casing and having an active and an inactive position, said lever normally being in its inactive position and movable to its active position to engage means to close said inlet, said casing having an opening in its side wall, said lever having one end projecting through said opening, an overflow chamber communicating with said constant level chamber, a float in said overflow chamber and cooperable with said lever to close said controlling means upon overflow into said chamber, a float in said constant level chamber cooperable with said controlling means to maintain a substantially constant level of liquid in said constant level chamber, said projecting lever end serving as a means for positioning said lever to normally inactive position, a spring acting on said lever and operable to urge said valve into inlet closing position, and a cover member on and secured to said casing and overlying said lever.

3. A device of the character described, comprising a casing containing a constant level chamber having an inlet and an outlet, means controlling said inlet, a lever having an active and an inactive position and fulcrumed in said casing, said lever normally being in its inactive position and engageable with said means to close said inlet, said casing having an opening in its side wall, said lever having one end projecting through said opening, means in said casing cooperable with the other end of said lever to urge said lever into engagement with said controlling means, an overflow chamber communicating with said constant level chamber, a float in said overflow chamber and cooperable with said lever to move said controlling means to close said inlet upon overflow into said chamber, a float in said constant level chamber cooperable with said controlling means to maintain a substantially constant level of liquid in said constant level chamber, said projecting lever end serving as a manually operable means for positioning said lever from the outside of said casing in its normally inactive position, and a cover member on and secured to said casing and overlying said lever.

4. A device of the character described comprising a casing having a reservoir with an upward opening inlet and an outlet, means controlling said inlet, guide means for said controlling means and fixed relative to said casing, a float in said reservoir and responsive to changes of liquid level therein, a lever arm fulcrumed intermediate its ends and operatively connecting said float and said controlling means, a lost-motion connection between said lever and said control means, said float acting at a predetermined liquid level in said reservoir to close said inlet, a second float responsive to a predetermined increase of liquid level above said predetermined level, said controlling means having a stem, and a lever having one end portion projecting from said casing, said second-named lever cooperating with said second-named float and with said stem and being operable on movement of said second-named float to close said inlet, said second-named lever being normally out of engagement with said stem, said lost-motion connection permitting said control means to move relative to said reservoir float upon engagement of said second-named lever and said control means.

5. A device of the character described comprising a casing having a bottom wall and containing a reservoir provided with an outlet, said wall having an aperture, an inlet member secured in said aperture and extending upward into said reservoir, said member having an inlet passageway therethrough with an internal annular shoulder, a control member in said passageway and cooperable with said shoulder to control flow to said reservoir, said inlet member having guide means for said control member, said control member projecting from said inlet member and having a lateral flange, a pivotally supported lever arm in said casing and having one end portion cooperable with said flange to actuate said control member, a lost-motion connection between said arm and said control member, a float in said reservoir and carried by the other end portion of said lever arm, an overflow chamber having communication with said reservoir, a float in said chamber operable upon overflow of liquid from said reservoir, and a normally inactive lever in said casing and cooperable with said second-named float, said normally inactive lever being normally out of engagement with said control member and operable on said control member to close said inlet passageway upon overflow of liquid into said chamber, said lost-motion connection permitting said control member to move relative to said reservoir float upon engagement of said lever and said control member.

6. A device of the character described comprising a casing containing a constant level chamber having an inlet and an outlet, means controlling said inlet, a normally inactive lever fulcrumed in said casing and engageable with said controlling means to close said inlet, said casing having an opening in its side wall, said lever having one end projecting through said opening, an overflow chamber communicating with said constant level chamber, a float in said overflow chamber and cooperable with said lever to close said inlet upon overflow into said chamber, a float in said constant level chamber cooperable with said controlling means to maintain a substantially constant level of liquid in said constant level chamber, a lost-motion connection between said second-named float and said control means, said projecting lever end serving as a manually operable means for resetting said lever from the outside of said casing to normally inactive position, and a cover member on and secured to said casing and overlying said lever, said lost-motion connection permitting said control means to move relative to said second-named float upon engagement of said normally inactive lever and said control means.

ROY W. JOHNSON.